Sept. 11, 1928.

C. N. FAIRCHILD

LOCK HOUSING

Filed July 27, 1925

Inventor
Charles N. Fairchild,
By Henry H. Snelling
Attorney

Patented Sept. 11, 1928.

1,684,311

UNITED STATES PATENT OFFICE.

CHARLES N. FAIRCHILD, OF MILFORD, CONNECTICUT, ASSIGNOR TO FAIRCHILD LOCK CORPORATION, OF NEW YORK, N. Y., A CORPORATION OF DELAWARE.

LOCK HOUSING.

Application filed July 27, 1925. Serial No. 46,369.

This invention relates to housings for locks and has for its principal object the provision of a lock housing in which the unsupported length of locking bolt between the casing and the tube of a steering post is reduced to a minimum, and in which the guide or support for this portion of the locking bolt is strengthened against the stress resulting from an attempt to steer when the steering post tube is locked to the steering post casing or jacket.

A further object of the present invention is the provision of a locking housing for a steering post in which the usual semi-cylindrical recess for the reception of the steering post casing or jacket is bridged by a straight rib extending as a chord to the circle of the steering post so that the steering post casing may be slotted to receive this rib by the mere making of straight line cuts. This rib not only prevents relative movement of the lock housing and the casing but it transmits stress from the free end of the bolt direct to the main body of the housing.

In the usual types of steering post locks the housing sheltering the locking mechanism is made in two pieces of unequal size and each of these two pieces is similarly recessed to receive the steering post outer casing or jacket, each recess being semi-cylindrical, and the two pieces are permanently secured to the column or jacket by brazing, welding, or by binding the two pieces together by bolts, the heads of which are later removed to prevent the unscrewing of the bolts.

In these types, due to the space existing between the steering post outer casing and the steering post tube in all commercial posts with which I am acquainted, the bolt is subject to a considerable bending moment when it is attempted to turn the steering wheel when the automobile is locked. It has been proposed to remedy this by making a cylindrical boss on one or both of the housing parts, but this requires the drilling of a circular hole in the casing, and if the boss is quite small it, too, is subject to bending stress.

By bridging the semi-cylindrical recess of one or both pieces of the housing by ribs having a free face in a plane at right angles to the axis of the locking member or bolt, and substantially tangent to the steering post tube, the slotting of the casing is made easy, a snug fit may readily be secured, elimination of possible movement of the housing relatively to the casing is assured, and ample support is given to the locking bolt without in any way sacrificing the desired freedom of movement of the steering post tube as the bridges are not intended to contact with the tube unless an attempt is made to turn the steering wheel when the car is locked. By reason of the great leverage obtained by the wheel, the tube is distorted under such circumstances and the two bridges then prevent injury to the tube as the clearance between the tube and the bridges is just small enough not to interfere with the normal operation of steering.

In the drawings:—

Figure 1:
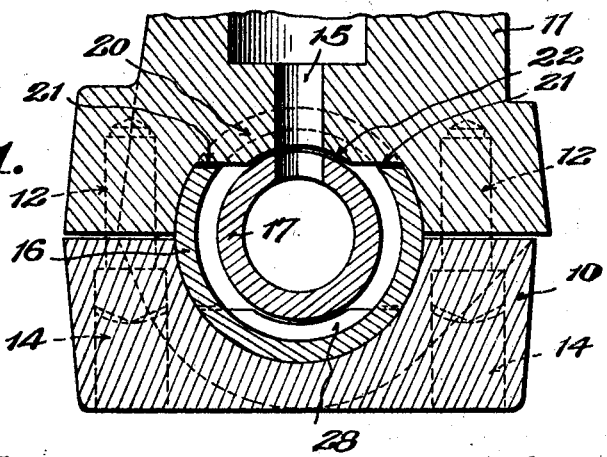
Figure 1 is a sectional view looking down the steering post, the section being taken in a plane at right angles to the steering post axis.

The housing cap 10 is secured to the larger portion 11 of the housing by means of one-way screws 12, for example, the heads of which are preferably some distance from the surface when seated, and the remainder of the bore is then filled with metal 14 to provide a smooth outer surface of the housing cap. The bore 15 receives the sliding bolt not shown, which locks the steering post tube 17 against movement with respect to the steering post outer casing or jacket 16.

The rib or bridge 20 is preferably flat on its free surface 21, the edge of which, as shown in Figure 1, is straight and forms a chord of the circle representing the outer surface of the casing or column, and this chord is parallel to a line tangent to the circle representing the outer surface of the steering tube 17 where it is intersected by the bolt receiving bore 15. Care must be exercised, however, to see that no friction exists between the tube and the bridge, and if necessary the bridge may be concaved as at 22 to provide the requisite clearance. It is my preference that the clearance shall be just sufficiently great to avoid friction, thus assuring that when the tube is distorted by turning when locked, the two bridges, if two are used as illustrated, shall prevent injury to the tube by preventing further elongation of the major diameter of the ellipse formed by such distortion.

Figure 2:
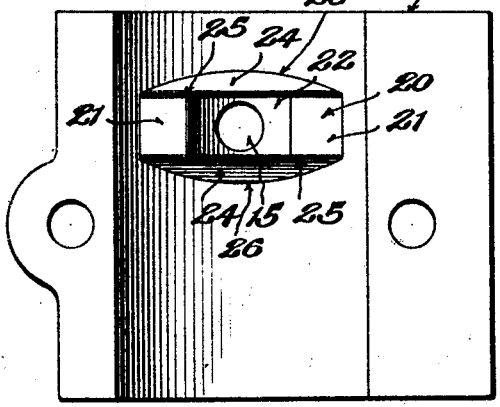
Figure 2 is a view at right angles thereto, showing the major portion of the housing, that is the portion that contains the locking bolt.
Figure 3:
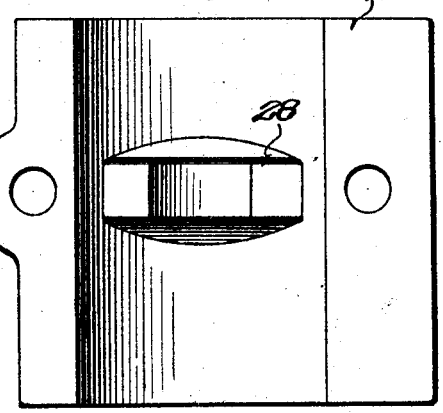
Figure 3 is a similar view of the housing cap.

The rib 20 may have vertical side walls, but since I prefer to forge this piece of metal, the two side walls 24 are slanted at an angle of 7° and are preferably plane as shown in Figures 1, 2, and 3, and the edges of the rib are preferably spaced away from all four edges of the semi-cylindrical recess, that is the two straight edges 25 and the two curved edges 26. The rib 28 of the housing cap is preferably located exactly centrally of the recess for the casing, but the similar rib 20 of the major portion of the housing is located to one side of the recess in more convenient location for the locking bolt which passes centrally through the rib 20, thus placing the two ribs out of alinement with one another.

Figure 4:
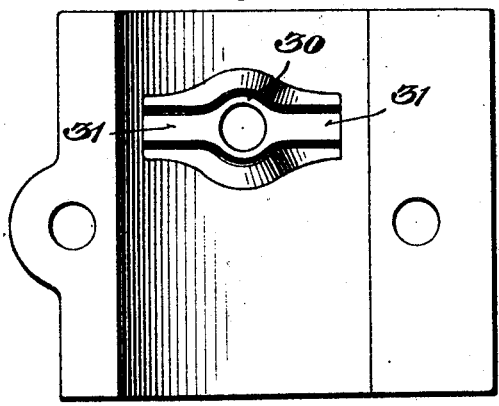
Figures 4 and 5 illustrate modifications.
Figure 5:
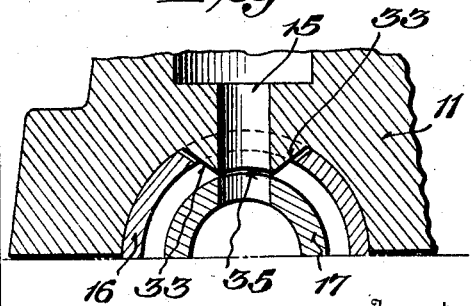

While I prefer that the top or free face of the ribs shall be rectangular in plan, this is not at all essential, and in Figure 4 I have shown the rib as consisting of a cylindrical portion or sleeve 30 having on either side a rib 31, integral with both the sleeve and the housing proper, but somewhat narrower than in the preferred form. These side ribs 31 may have tops at right angles to the axis of the bolt as in the preferred form, or the top surfaces may be slanted down as at 33 in Figure 5, in which modification I have shown the central sleeve as cylindrically concave as at 35, which is sometimes convenient. While the form shown in Figure 5 requires more time for the making of the slots in the outer casing of the steering tube, the amount of metal removed is less than in the preferred form illustrated in Figure 1.

What I claim is:—

1. A steering post lock housing section of the type having a recess to receive the steering post jacket or casing, characterized by the provision of a non-circular member adapted to fit a similar shaped opening in the steering post jacket or casing to secure the housing against displacement with respect to said jacket or casing.

2. A steering post lock housing section of the type having a recess to receive the steering post jacket or casing, characterized by the provision of an integral member spaced from the four edges of the recess in which the major portion of the face of the member is substantially plane and at right angles to the axis of the steering tube locking bolt.

3. A steering post lock housing of two sections each having a semi-cylindrical recess therein to receive the steering post casing or jacket, each section having an integral rib crossing the recess as a bridge, and being spaced from all four edges of the recess.

4. The device of claim 3 in which the opposed faces of the ribs are parallel and substantially confine the steering tube therebetween.

5. The device of claim 3 in which one of the two ribs is shifted from a diametrically opposite position with respect to the other rib.

6. The device of claim 3 in which each of the ribs is provided with a central cylindrical recess to clear the steering post tube and one of the ribs is centrally perforated to receive the steering post tube locking bolt.

7. A lock housing recessed to receive a cylindrical steering post and having a bore to receive a bolt adapted to lock the steering tube to the casing, characterized by the provision of a transverse guide integral with the housing, extending laterally through the steering post casing, surrounding the bolt to support the bolt between the tube and casing, said guide transmitting side thrusts from the end of the locking bolt direct to the side walls of the lock housing.

8. A lock housing recessed to receive a cylindrical steering post and having a bore to receive a bolt adapted to lock the steering tube to the casing, characterized by the provision of a guide integral with the housing, extending through the steering post casing, surrounding the bolt to support the bolt between the tube and casing, said guide having a rib on either side thereof connecting the guide with the wall of the semi-cylindrical recess, the outer wall or face of the two ribs lying in a plane at right angles to the axis of the bolt, whereby a side thrust on the end of the bolt in line with the ribs is transmitted through solid metal to the body of the housing.

In testimony whereof I affix my signature.

CHARLES N. FAIRCHILD.